United States Patent [19]

Nishino et al.

[11] Patent Number: 5,463,880
[45] Date of Patent: Nov. 7, 1995

[54] ABSORPTION REFRIGERATOR

[75] Inventors: Yoshitaka Nishino; Toshio Sawa, both of Hitachi; Takashi Nakao, Ami; Michihiko Aizawa, Ushiku; Kenji Yokose, Hitachi, all of Japan

[73] Assignee: Hitachi, Ltd., Tokyo, Japan

[21] Appl. No.: 192,830

[22] Filed: Feb. 7, 1994

[51] Int. Cl.$^6$ .................................................... F25B 15/00
[52] U.S. Cl. ................................................ 62/484; 62/476
[58] Field of Search .............................. 62/476, 484, 494

[56] References Cited

U.S. PATENT DOCUMENTS

| | | | |
|---|---|---|---|
| 2,196,707 | 4/1940 | Nelson et al. | 62/494 |
| 2,210,496 | 8/1940 | Peltier | 62/494 |
| 4,127,009 | 11/1978 | Phillips | 62/101 |
| 5,205,352 | 4/1993 | Takahashi et al. | 165/113 |
| 5,325,684 | 7/1994 | Stierlin et al. | 62/487 |

FOREIGN PATENT DOCUMENTS 58-19021 of 1983 Japan.
62-155482 of 1987 Japan.
63-6363 of 1988 Japan.
5-71827 of 1993 Japan.

*Primary Examiner*—Henry A. Bennet
*Assistant Examiner*—William C. Doerrler
*Attorney, Agent, or Firm*—Antonelli, Terry, Stout & Kraus

[57] ABSTRACT

An absorption refrigerator is characterized by an absorber which has a tube bank of heat-conductive tubes in the absorber, a vapor flow passage between the tube bank and a side wall of the absorber which is opposite to and separated from the tube bank in a radial direction of the heat-conductive tubes by a distance equal to or larger than a maximum pitch of the heat-conductive tubes, at least a baffle plate disposed in the vapor flow passage, and a gas extraction port disposed outside the tube bank. A further arrangement is characterized by an absorber having a tube bank in the absorber, a vapor flow passage between the tube bank and a side wall of the absorber, and a gas extraction port disposed around a central portion of the tube bank.

22 Claims, 7 Drawing Sheets

PRESSURE PLOT POSITIONS

PRESSURE PLOT POSITIONS

ABSORPTION REFRIGERATOR

BACKGROUND OF THE INVENTION

The present invention relates to an absorption refrigerator and, more particularly, to an improvement in an absorber of the absorption refrigerator.

In general, an absorption refrigerator comprises an absorber, an evaporator, a condenser, a low temperature generator, a high temperature generator, a heat exchanger and pipings with pumps for fluidly connecting them. The evaporator has a tube bank therein in which water flows. Water as a refrigerant is sprayed outside the tube bank to cool the water inside the tube bank by latent heat of evaporation. The cooled water is supplied as a coolant to a cooler or the like. Steam or vapor generated in the evaporator flows into the absorber and it is absorbed into an absorbent, such as lithium bromide, which is sprayed on the tube outer surfaces of a tube bank arranged in the absorber. Absorption heat generated at this time is picked up by cooling water flowing in the tube bank. The absorbent which absorbed vapor in the absorber is lowered in concentration and it also is weakened in absorbability. Therefore, the absorbent is sent to the high temperature generator and the low temperature generator to heat and concentrate there after pre-heating by passing through the heat exchanger. Generally, heat generated by burning gas, oil, etc. is used as a heat source of the high temperature generator. The vapor generated in the high temperature generator is used as a heat source of the low temperature generator. The vapor generated in the high temperature generator and the low temperature generator is cooled finally by cooling water in the condenser to form a condensate. The condensed water is supplied to the evaporator as an evaporation medium. The absorber is the most important component of all the components of the absorption refrigerator from the point of view of performance of the absorption refrigerator.

Both the evaporator and the absorber are kept to a low pressure. Therefore, in the evaporator, the coolant, such as water flowing in the tube bank can be cooled with latent heat by evaporating an evaporation medium, such as water sprayed on the outer surface of the tube bank, as mentioned above. The absorber, in general, comprises a tube bank in which tubes are arranged in a zigzag fashion or in a lattice fashion, and a spray device for spraying absorbent on the outer surfaces of the tube bank. In general, a lithium bromide solution is used as the absorbent, and is sprayed on the outer surfaces of the heat-exchange or heat-conductive tube bank. The vapor pressure of the lithium bromide solution is much smaller than that of water, the vapor flowing from the evaporator into the absorber being absorbed depending on the pressure difference therebetween. In this case, the temperature of the absorbent is raised by absorption heat, and so the absorbent is cooled by causing coolant, such as water, to flow in the tube bank.

In order to improve the performance of the absorption refrigerator, it is necessary to increase the effective pressure difference between the vapor pressure in the evaporator and the vapor pressure in the absorber in view of the above-mentioned principle of absorption cycle operation. Therefore, first, it is necessary to increase the pressure difference available to absorb the vapor in the absorber by decreasing the flow resistance (pressure loss) of the vapor in the tube banks of the evaporator and the absorber. Secondly, it is necessary to increase the absorption heat conduction characteristic in the absorber. There are three ways for carrying this out. One of them is by forming fins on the surfaces of heat exchange tubes in the manner disclosed in JP A 63-6363 (1988) to increase the absorption heat conductive characteristic of a single tube of the tube bank, thereby increasing the heat conductive area and increasing the amount of absorbent retained on the surfaces. Another is a method of preventing uncondensed gas, such as air, to stagnate, which uncondensed gas then becomes a conductive resistance on the vapor side. And another is a way to reduce the number of conductive tubes which are not to be used for absorption by supplying absorbent evenly over each heat exchange tube in the absorber. An example of a prior proposal for increasing the performance is disclosed in JP B 58-19021 (1983) in which an evaporator has a heat exchange tube bank formed in lattice form of small pitch at an upstream side of the vapor flow and in a zigzag form of a larger pitch at the downstream side at which a larger amount of the vapor flows, and an absorber also has a heat exchange tube bank formed in a zigzag form of large pitch at an upstream side of the vapor flow at which a larger amount of vapor flows and in lattice form of small pitch at a downstream side of the vapor flow, whereby the flow resistance is made uniform in the tube banks. Another example is in JP A 62-155482 in which partitions are provided in an absorber, which partitions are parallel with the outermost tube rows, whereby gas is prevented from becoming stagnant and is extracted from the tube bank.

SUMMARY OF THE INVENTION

An object of the invention is to provide an absorption refrigerator in which the pressure loss in a tube bank is reduced and stagnation of uncondensed gas, such as air in an absorber, is prevented.

In an aspect of the present invention, an absorption refrigerator is characterized by an absorber comprising a tube bank of heat-conductive tubes in the absorber, a vapor flow passage between the tube bank and a side wall of the absorber which is opposite to and separated from the tube bank in a radial direction of the heat-conductive tubes by a distance equal to or larger than a maximum pitch of the heat-conductive tubes, at least a baffle plate disposed in the vapor flow passage, and a gas extraction port disposed outside the tube bank.

Provision of the vapor flow passage reduces pressure loss in the vapor flow within the absorber and the baffle plate serves to ensure that vapor flow within the tube bank finally reaches around the gas extraction port out of the tube bank.

In another aspect of the invention, an absorption refrigerator is characterized by an absorber comprising a tube bank of heat-conductive tubes in the absorber, a vapor flow passage between the tube bank and a side wall of the absorber which is opposite to and separated from the tube bank in a radial direction of the heat-conductive tubes by a distance equal to or larger than a maximum pitch of the heat conductive tubes, and a gas extraction port disposed around a central portion of the tube bank.

According to this aspect of the invention, pressure loss or vapor flow passage resistance is reduced by the vapor flow passage, and uncondensed gas, such as air, is extracted by the gas extraction port disposed around a portion in which the gas or air flow is apt to stagnate.

BRIEF DESCRIPTION OF THE DRAWINGS

FIG. 1b is a sectional view of an absorber, taken along a line perpendicular to the longitudinal direction of tubes of a tube bank, as used in FIG. 1a;

FIG. 2b is a sectional view of an absorber, taken along a line perpendicular to the longitudinal direction of tubes of a tube bank, as used in FIG. 2a;

FIG. 7b is a schematic view showing air partial pressure distribution by numerical analysis in the absorber shown in FIG. 7a;

FIG. 8b is a schematic view showing air partial pressure distribution by numerical analysis in the absorber shown in FIG. 8a.

DESCRIPTION OF EMBODIMENTS OF THE INVENTION

An embodiment of the invention will be described hereunder referring to FIGS. 1a and 1b.

Figure 1A:
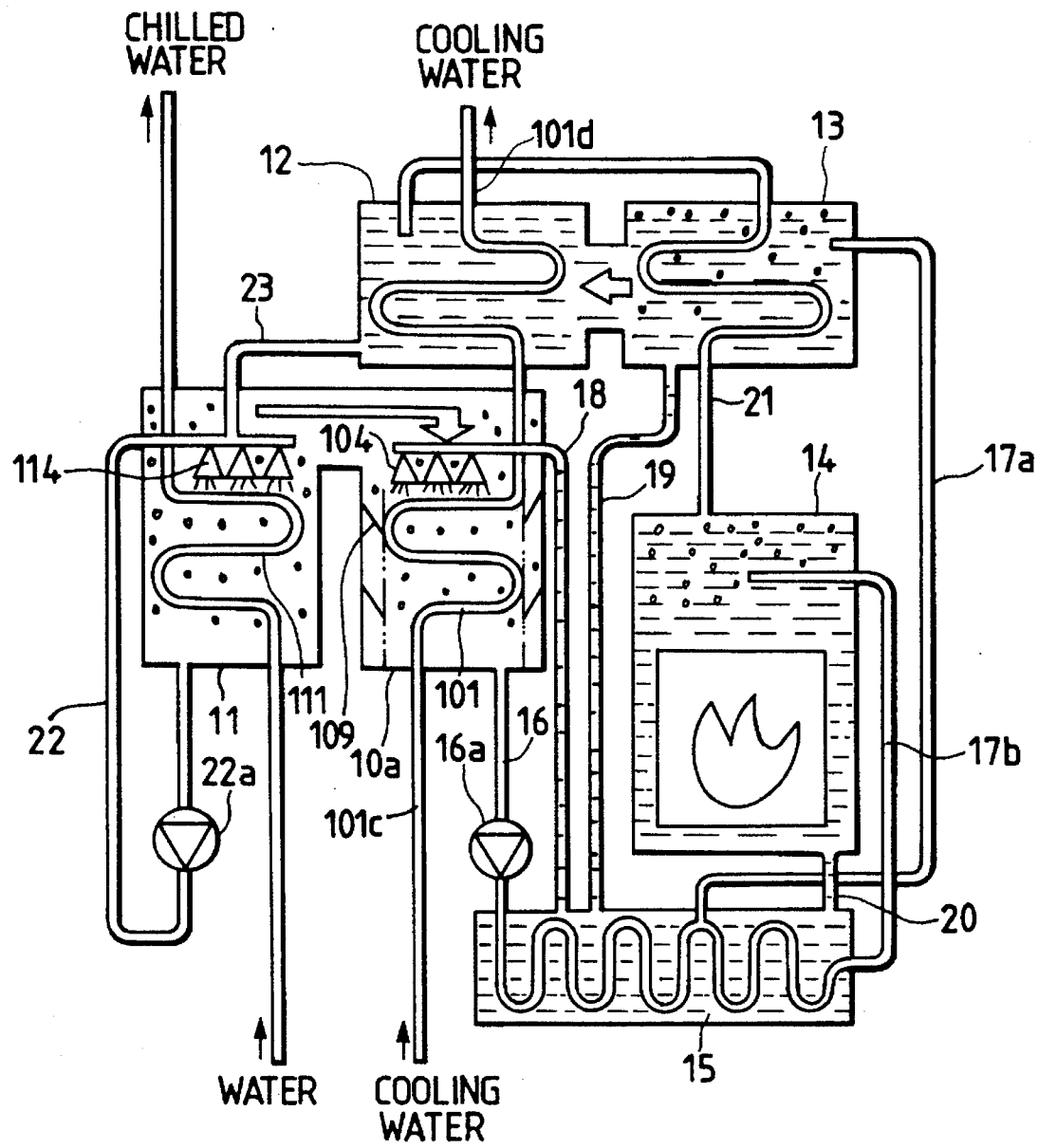
FIG. 1a is a schematic view of an absorption refrigerator forming an embodiment of the present invention.

In FIG. 1a, an absorption refrigerator comprises an absorber 10a, an evaporator 11, a condenser 12, a low temperature generator 13, a high temperature generator 14, a heat exchanger 15 and various pipings including pumps. The evaporator 11 has a tube bank 111 in which water flows, and a spray device 114 for spraying water. The sprayed water evaporates and evaporation latent heat cools the water in the tube bank 111 thereby to produce chilled water. The chilled water is used for a cooler or the like.

Vapor generated in the evaporator 11 flows into the absorber 10a at an vapor inlet at an upper side thereof. The absorber 10a has a tube bank 101, connected to tubes 101c and 101d and a spray device 104. Absorbent, such as lithium bromide, is sprayed by the spray device 104 and absorbs the vapor which flows into the absorber 10a to generate absorption heat. The absorption heat is absorbed by cooling water flowing in the tube bank 101 to be cooled. The absorbent which has absorbed the water vapor and weakened in concentration is sent to a heat exchanger 15 by a pump 16a provided in a pipe 16 connecting the absorber 10a and the heat exchanger 15 to pre-heat the absorbent. Part of the pre-heated absorbent in the heat exchanger 15 is sent to the low temperature generator 13 through a pipe 17a to be heated and concentrated and the concentrated absorbent is returned to the heat exchanger 15 through a pipe 19. The other part of the pre-heated absorbent also is sent to the high temperature generator 14 through a pipe 17b to be heated and concentrated and the concentrated absorbent is returned to the heat exchanger 15 through a pipe 20. The concentrated or regenerated absorbent in the heat exchanger 15 is fed to the spray device 104 in the absorber 10a through a pipe 18. Water vapor generated by the heating in the low temperature generator 13 and in the high temperature generator 14 is sent to the condenser 12 to be cooled and condensed by cooling water flowing in the tube 101d. A heat source of the low temperature generator 13 is the vapor generated in the high temperature generator 14 and sent through a pipe 21. A heat source for the high temperature generator 14 is heat generated by burning gas, oil or the like. The condensed water in the condenser 12 is sent to the evaporator 11 through a pipe 23 to be used as water for evaporation together with water recirculated by a pump 22a provided in a recirculation pipe 22.

Figure 1B:
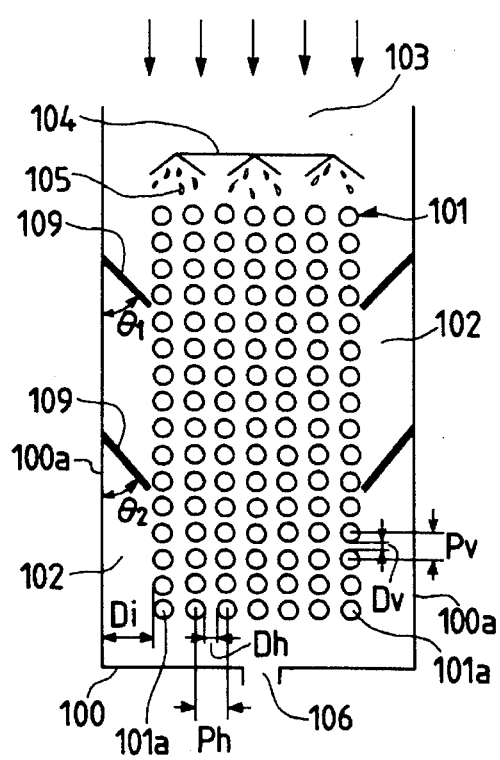

Details of the absorber 10a are illustrated in FIG. 1b.

In FIG. 1b, the absorber 10a has a housing 100 having a vapor inlet opening 103 at an upper side thereof, a tube bank 101 disposed in the housing 100, the spray device 104 provided at an upper side and a plurality of baffle plates 109. The tube bank 101 includes a plurality of parallel tube portions which are arranged in a lattice form and formed of a plurality of tube rows arranged horizontally. Both ends of the parallel tube portions each are in a form of a water chamber casing like a header, which construction is conventional. The tube bank 101 has a relatively more crowded tube arrangement than the conventional tube arrangement. Vapor flow passages 102 are formed between the outermost tube row 101a of the tube bank 101 and each side wall 100a of the housing 100. The vapor flow passages 102 extend vertically and axially of the tube bank 101, and the width of the vapor flow passage 102, that is, the distance (Di) between the side wall 100a and the outermost tube row 101a is larger than the maximum pitch (Ph) between the tube rows.

The absorber 10a has one or more baffle plates 109 provided in each vapor flow passage 102. The baffle plates 109 are inclined against the side wall 100a at an inclination angle $\theta_1$ of 20° to 60°, preferably 45°, and at an inclination angle $\theta_2$ of 30° to 70°, preferably 50°. The baffle plates 109 at the upper side are preferably to be positioned at about a central portion of the upper half of the height of the tube bank 101 and the lower side baffle plates 109 are preferably to be positioned a little above the center of the lower half of the tube bank 101.

For the absorber 10a of small size, it is preferable to provide only one baffle plate 109 in each vapor flow passage 102. In this case, the baffle plate 109 is provided a little below the center of the lower half of the tube bank 102.

Provision of the vapor flow passages 102 reduces pressure loss of the vapor in the absorber 10a. Irrespective of the more crowded tube arrangement of the tube bank 101, the pressure loss is reduced. The baffle plates 109 are for adjusting vapor flows which enter the absorber 10a at the upper inlet opening 103 so that the vapor flows can reach all the way to the lower end of the tube bank 101. A gas extraction port 106, which represents a common absorbent discharge outlet is provided about the end at which the vapor flow finally reaches. An example of the position is a bottom of the housing 100. The port 106 is fluidly connected to the pipe 16 in FIG. 1a. The port 106 can have an ejector construction for effectively extracting uncondensed vapor, such as air, while discharging the absorption solution.

In this absorber 10a, vapor generated in the evaporator 11 enters the absorber 10a at the vapor inlet opening 103 at the upper portion of the absorber 10a. The vapor flows from the upper side to lower side in the vapor flow passages 102 and in the tube bank 101. Flow resistance in the vapor flow passage 102 is sufficiently small that it can be disregarded, as compared with flow resistance of the crowded tube bank 101. The vapor flowing in the vapor flow passages 102 enters the tube bank 101 at the side of the tube bank by operation of the baffle plates 109 and some vapor in the tube bank 101 enters the vapor flow passages 102 at a downstream side of the baffle plates 109 at the upper side. The vapor in the vapor flow passages 102 also enters the tube bank 101 by operation of the baffle plates 109 at the lower side and some part of vapor enters the vapor flow passages 102 downstream of the baffle plates 109. In this manner the vapor flows from the upper side to the lower side of the absorber 10a.

Absorbent is supplied into the absorber 10a from the spraying device 104. The absorbent is sprayed onto the tube bank 101. The absorbent sprayed on the uppermost heat-conductive tubes of the tube bank 101 flows on the surfaces thereof and flows down onto the next uppermost heat-conductive tube. In this manner the absorbent supplied into the absorber 10a flows down to the bottom side of the absorber 10a. During this time, the absorbent absorbs vapor flowing in the absorber 10a to generate absorption heat and the absorption heat is picked up by the cooling water flowing in the tube bank 101 and carried out of the absorber 10a.

In order for the heat-conductive tube surfaces at the lower side of the tube bank 101 to be covered with absorbent, the distance between adjacent heat-conductive tubes in vertical tube lines is preferably to be small. The distance (Dv) between outer peripheral surfaces of the vertically adjacent tubes should be 5 mm or smaller to stably supply the lower portion of the tube bank 101 with absorbent. In order to satisfy this condition irrespective of the outer diameter of the heat-conductive tubes, the heat-conductive tubes are arranged in a lattice form. The pressure loss of the tube bank 101 arranged in lattice form is determined by the distance between tubes in a line perpendicular to the direction of vapor flow, that is, by a sectional area through which vapor can pass. In this case, the distance (Dh) between outer surfaces of the horizontally adjacent heat-conductive tubes is 10 mm or more, whereby the pressure loss is reduced. When the distance between the outer surfaces of vertically adjacent heat-conductive tubes is 5 mm or smaller, absorbent flows down like a curtain which extends from an upper tube to a lower adjacent tube. The vapor flows down between the curtains of absorbent, and the final flow end of the vapor reaches a lower portion of the tube bank 101. The vapor in the vapor flows passages 102 flow into and out of the tube bank 101 breaking through the curtain-like absorbent flows which descend through the bank 101.

The following arrangement of the heat-conductive tubes in the tube bank 101 can be taken as an example:

(1) In a lattice form of the heat-conductive tubes, the horizontal pitch Ph is 22 to 40 mm, and the vertical pitch Pv is 20 to 30 mm. When the heat-conductive tube has a diameter of 19 mm, which is larger than a conventional tube diameter of 15.66 mm, the pitch Ph is 29 to 40 mm, and the pitch Pv is 24 to 20 mm.

In a zigzag form of the tubes, Ph is 38 to 50 mm and Pv is 9 to 30 mm when the tube diameter is 19 mm.

Another embodiment of the invention will be described hereunder, referring to FIGS. 2a and 2b.

This embodiment differs from the embodiment in FIGS. 1a and 1b only in the form of the absorber 10b. The absorber 10b is described mainly and the same reference numbers are taken for parts or elements having same function in FIGS. 1a and 1b.

Figure 2B:
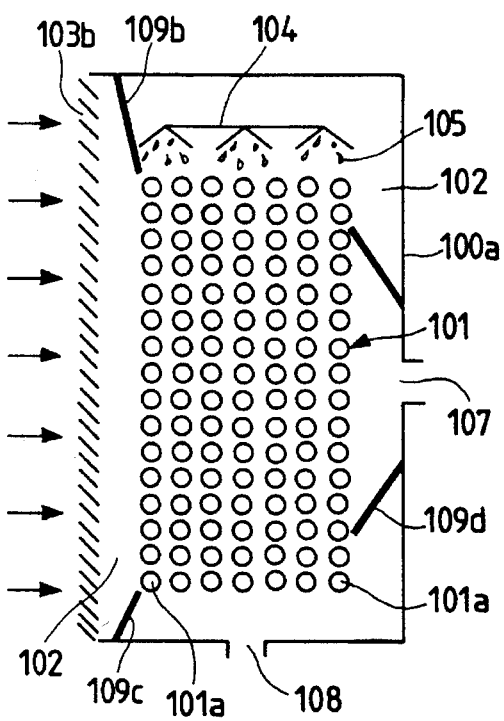
Figure 2A:
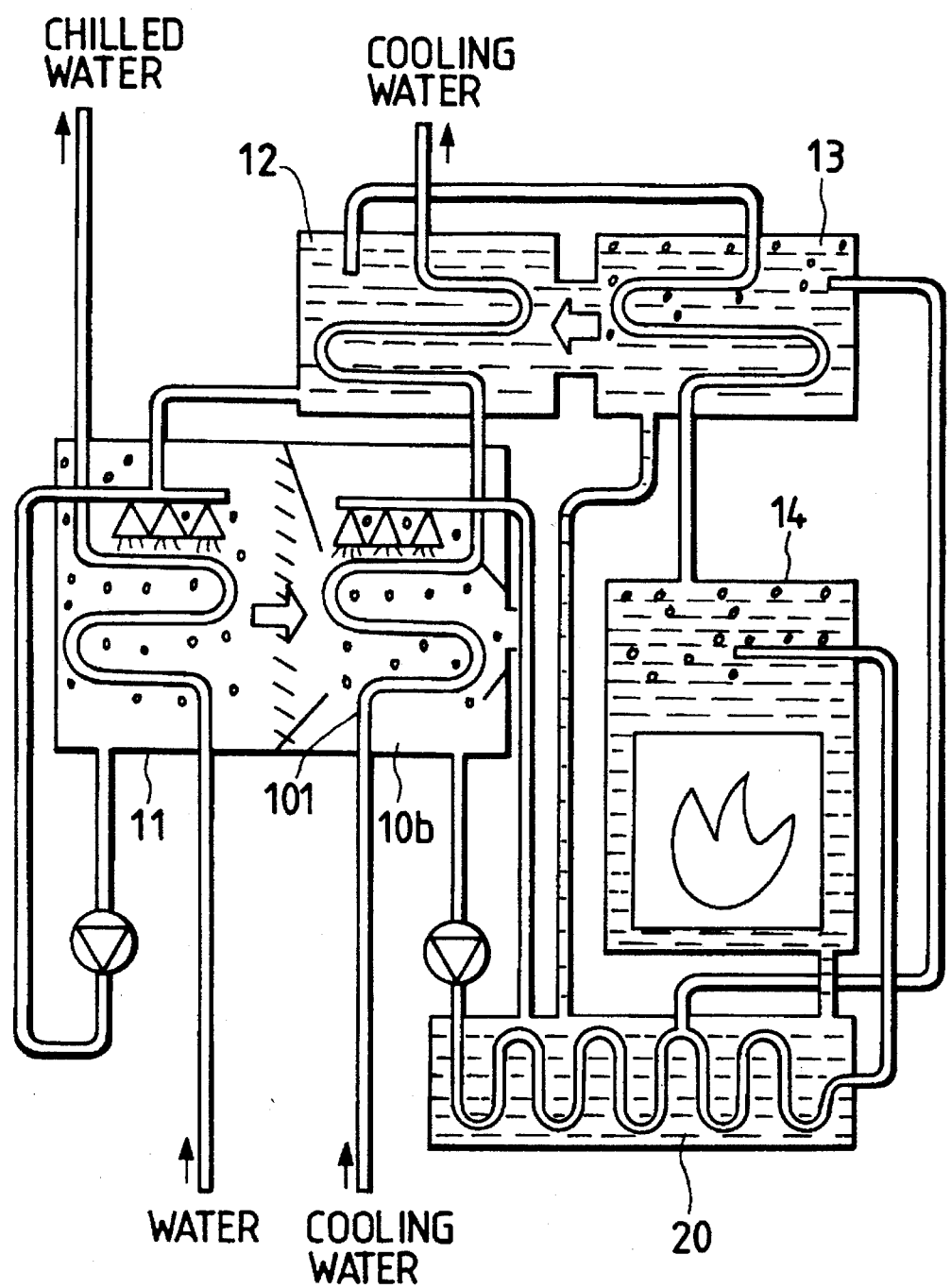
FIG. 2a is a schematic view of an absorption refrigerator forming another embodiment of the present invention.

In FIGS. 2a and 2b, the absorber 10b is provided with a spray device 104 at the upper side thereof, a tube bank 101 arranged in a lattice form and a discharge port 108 for absorbent at a bottom portion. The arrangement of the tube bank 101 is the same as that of the previous embodiment, but an inlet opening for vapor generated in the evaporator 11 is provided along the length of one side opposite to the outermost tube row 101a of the tube bank 101. At the inlet opening an eliminator 103b is provided for removing mist so as to pass substantially only vapor therethrough. A gas, extraction port 107 for uncondensed gas, such as air, is provided in a side wall 100a at the opposite side to the eliminator 103b. Vapor flow passages 102 are provided between the eliminator 103b and the outermost tube row 101a of the tube bank 101 and between the wall 100a and the outermost tube row 101a opposite to the wall 100a, respectively. The vapor flow passages 102 each have a width equal to or larger than the largest pitch of the tube rows. Baffle plates 109b, 109c are provided in the vapor flow passage 102 at an upstream side or at the inlet side, and baffle plates 109d are provided in the vapor flow passage 102 at an opposite side to the inlet side. The gas extraction port 107 is provided between the baffle plates 109d.

Vapor generated in the evaporator 11 enters the absorber 10b at the inlet horizontally opened at the eliminator 103b, and flows horizontally through the tube bank 101. Absorbent is sprayed by the spray device 104 onto the tube bank 101 and flow downwards while absorbing the vapor received from the evaporator 11. The absorbent which has absorbed the vapor is discharged at the discharge port 108. Absorption heat generated during absorption is absorbed by water flowing in the tube bank 101 to be cooled. Uncondensed gas is exhausted from the gas extraction port 107.

The vapor flow passages 102 serve to reduce pressure loss and the baffle plates 109b, 106c and 109d adjust the vapor flow so that the final flow will reach the end of vapor path around the gas extraction port 107.

Figure 3:
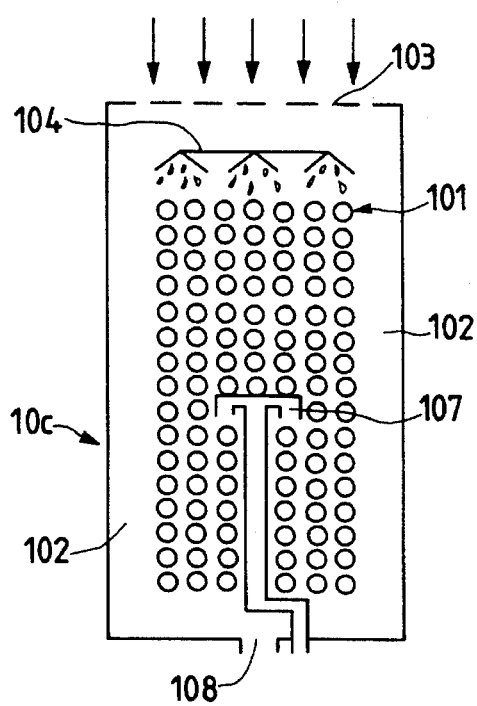
FIG. 3 is a sectional view of an absorber, taken along a line perpendicular to the longitudinal direction of tubes of a tube bank, according to another embodiment of the present invention.

FIG. 3 shows an absorber 10c forming another embodiment of the present invention. In FIG. 3, the absorber 10c has substantially the same construction as the absorber 10a in FIGS. 1a, 1b except that the baffle plates 109 are not provided and an gas extraction port 107 is disposed around a central portion of the absorber.

Vapor generated in an evaporator enters the absorber 10c at an inlet opening 103 at an upper side, flows in vapor flow passages 102 provided within the absorber 10c, flows toward the central portion of the tube bank 101 from all the peripheral portions of the tube bank 101, and finally reaches the central portion. Air can be extracted from the gas extraction port 107 provided at the central portion of the tube bank 101.

Figure 4:
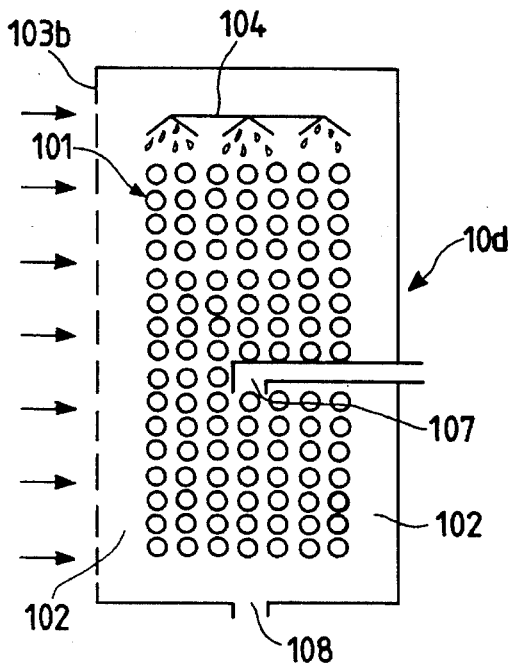
FIG. 4 is a sectional view of an absorber, taken along a line perpendicular to the longitudinal direction of tubes of a tube bank, according to still another embodiment of the present invention.

FIG. 4 shows an absorber 10d forming still another embodiment of the present invention. In FIG. 4, the absorber 10d has substantially the same construction as the absorber 10b in FIGS. 2a, 2b except that the baffle plates 109b to 109d are not provided and an gas extraction port 107 is disposed around a central portion of a tube bank 101.

Vapor generated in an evaporator enters the absorber 10d through an eliminator 103 provided at an inlet opening at a vertical side, flows in vapor flow passages 102 within the absorber 10d, flows toward the central portion of the tube bank 101 from all the peripheral portions of the tube bank 101, and finally reaches the central portion at which the gas extraction port 107 is disposed.

Figure 5:
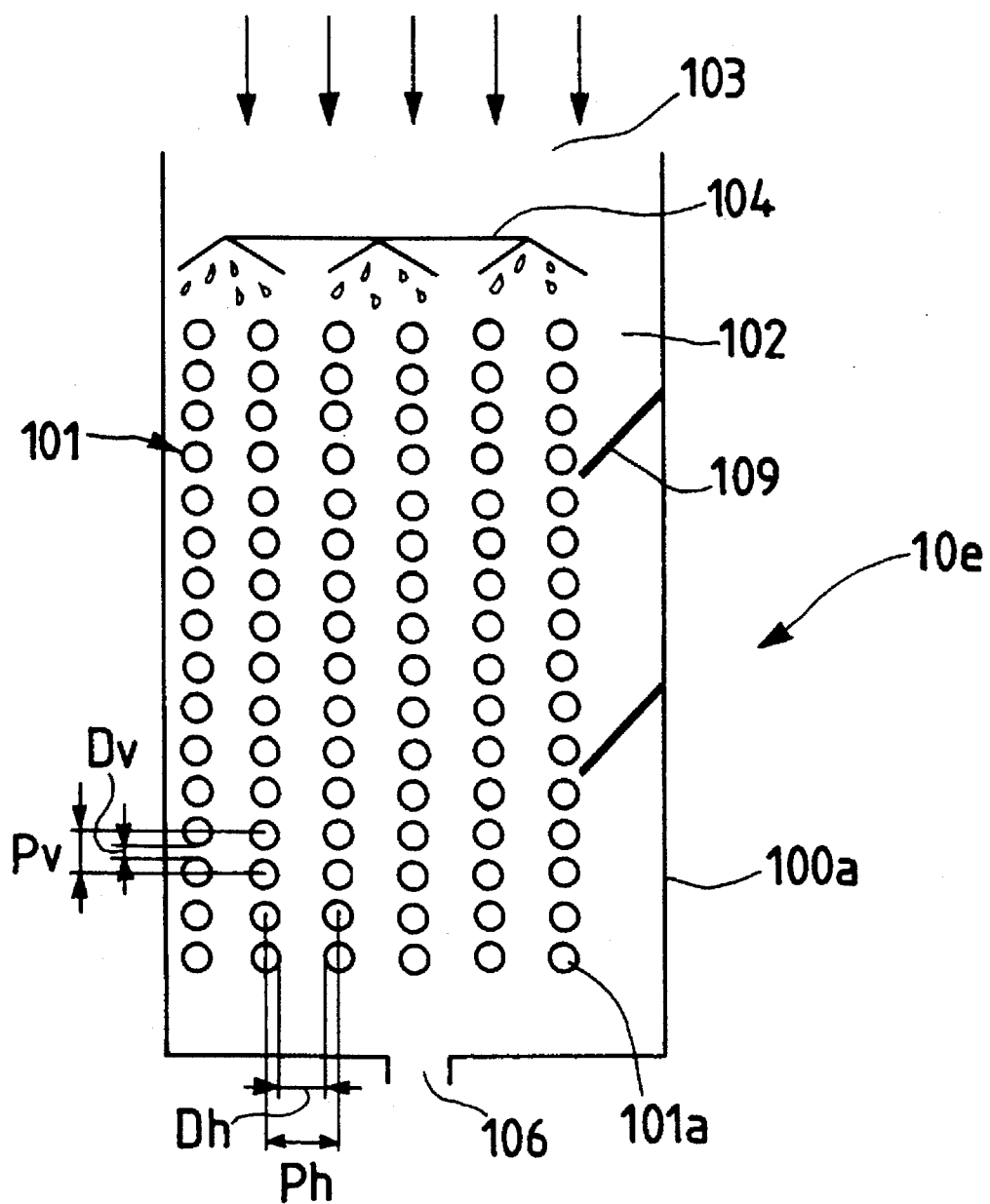
FIG. 5 is a sectional view of an absorber, taken along a line perpendicular to the longitudinal direction of tubes of a tube bank, according to a further embodiment of the present invention.

FIG. 5 shows a further embodiment of the invention.

In FIG. 5, an absorber 10e has a tube bank 101 arranged so that only one vapor flow passage 102 is provided between the outermost tube row 101a and a side wall 100a. Two baffle plates 109 are provided in the vapor flow passage 102 in a similar manner to the embodiment shown in FIGS. 1a, 1b. In this embodiment, the tube bank 101 has a tube arrangement in a lattice form, wherein the tube pitch (Ph) in the horizontal direction is about twice the diameter of the heat conductive tube and the vertical distance (Dv) between adjacent tube surfaces in the vertical direction is about 3 mm, so that the pitch (Pv) of the heat-conductive tubes in the vertical direction is smaller than the horizontal pitch (Ph).

Vapor from an evaporator enters the absorber 10d at an inlet opening 103 at the upper side, flows into tube bank 101 directly and through the vapor flow passage 102 and flows downwards. Absorbent from a spray device 104 flows down on surfaces of the heat-conductive tubes of the tube bank 101 and absorbs the vapor. The absorbent which absorbed the vapor is discharged from the outlet port 106 together with uncondensed gas. The absorption heat is rejected by water flowing in the tube bank 101.

It will be explained hereunder using numerical analysis results of a fundamental tube arrangement in an absorber that the principle of the invention is proper, referring to the drawings. In this numerical analysis, the law of conservation of mass and momentum is solved with respect to flow, and an absorption amount of vapor in the tube tank is obtained on the basis of an experimental equation. The details of the analytical model are described in the Proceedings of the Second International Symposium on Condensers and Condensation (1990), pages 235 to 244.

Figure 6A:
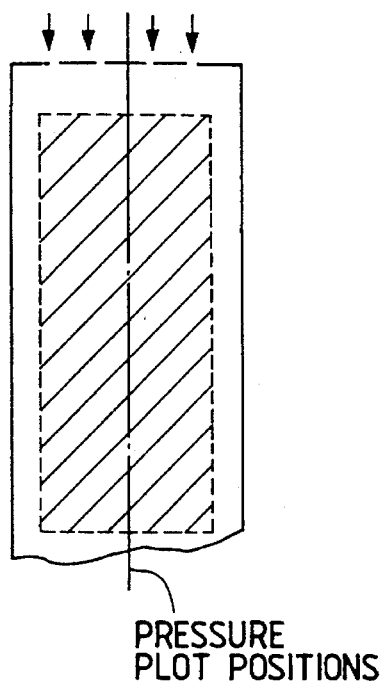
FIG. 6a is a schematic sectional view of an absorber having vapor flow passages, taken along line perpendicular to the longitudinal direction of tubes of a tube bank, for explanation of pressure distribution by numerical analysis.
Figure 6B:
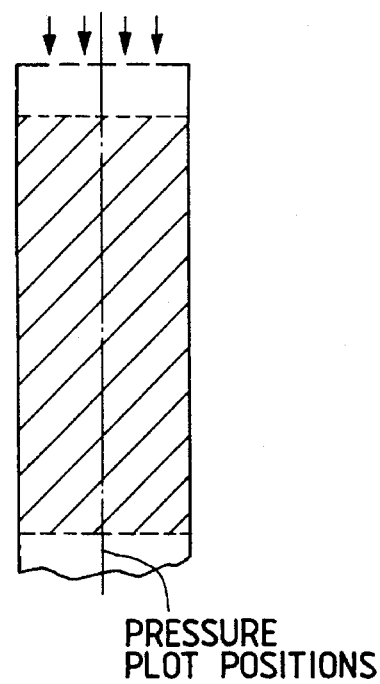
FIG. 6b is a schematic sectional view of an absorber having no vapor flow passage, taken along a line perpendicular to the longitudinal direction of tubes of a tube bank, for explanation of pressure distribution by numerical analysis.
Figure 6C:
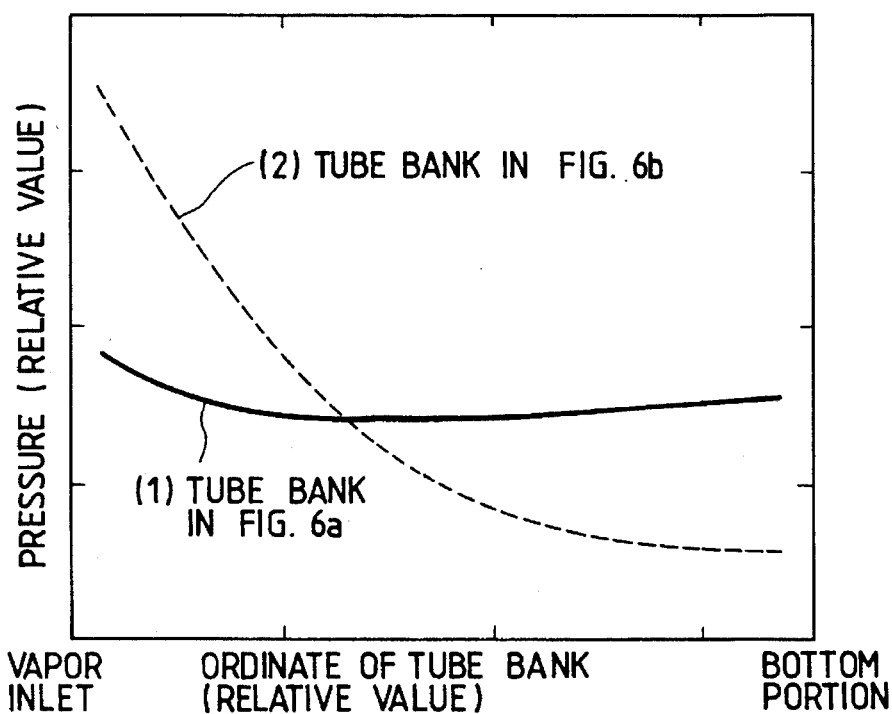
FIG. 6c is a graph showing pressure distributions of the absorbers shown in FIGS. 6a and 6b.

FIGS. 6a and 6b each show a sectional view taken along a line perpendicular to a longitudinal direction of a tube tank of a different kind of absorber for which a numerical analysis is carried out. The two kinds of absorbers each have a heat-conductive tube arrangement including the same number of tubes (outer diameter 19.05 mm), i.e. 198 tubes, and having the same pitch as each other. In each absorber, vapor enters the absorber at an upper portion thereof. The absorber shown in FIG. 6a has vapor flow passages formed between the tube bank (hatching portion) and the side walls of the absorber and the absorber shown in FIG. 6b does not have such a vapor flow passage. FIG. 6c shows numerical analysis results of the pressure distribution taken along pressure plot positions indicated in FIGS. 6a and 6b. It is noted from the result that the absorber having the vapor flow passages as shown in FIG. 6a is more uniform in pressure distribution and smaller in pressure loss than the absorber having no vapor flow passage.

Figure 7A:
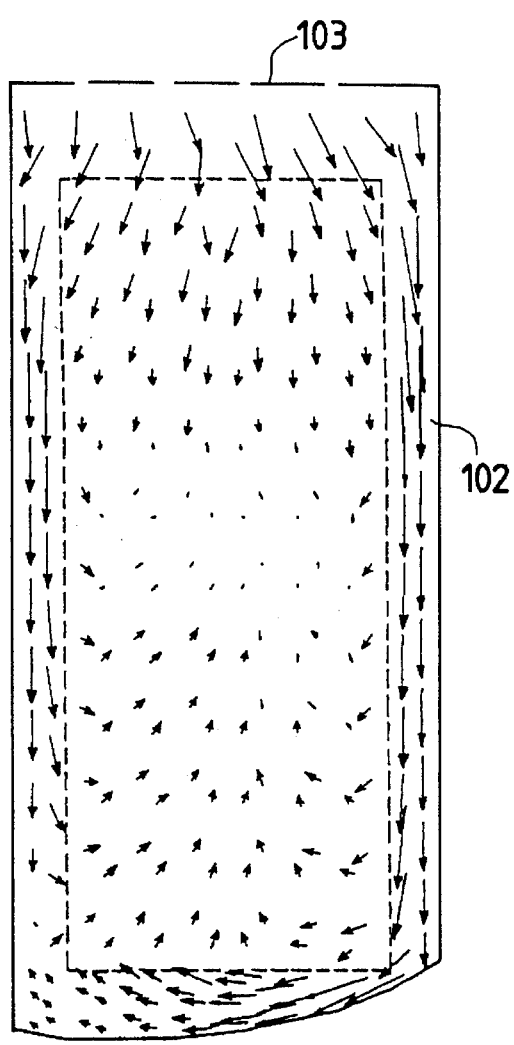
FIG. 7a is a schematic view showing vapor flow speed distribution by numerical analysis in an absorber having vapor flow passages.
Figure 7B:
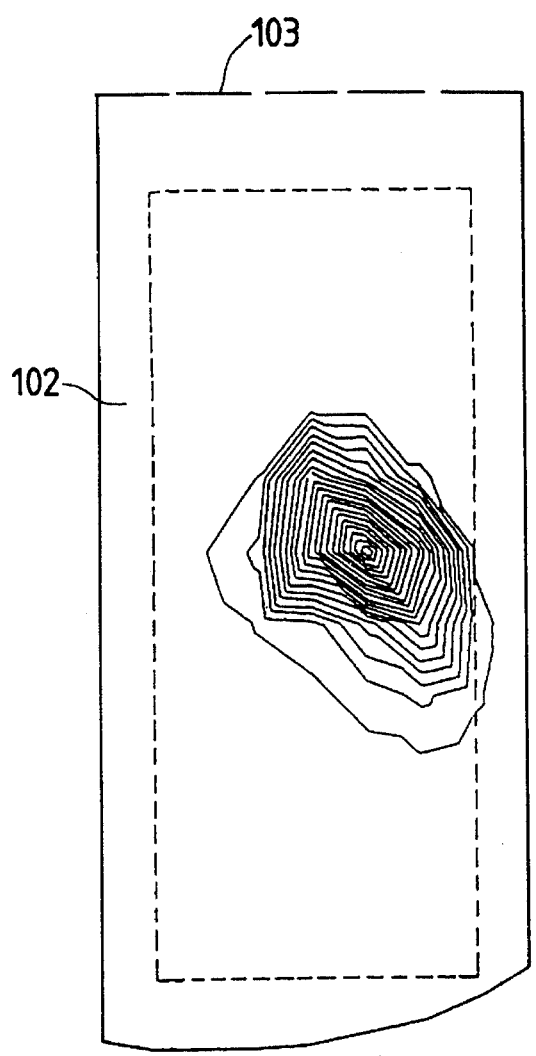

FIGS. 7a and 7b show numerical analysis results of vapor speed distribution and air partial pressure in an absorber in which vapor flow passages are formed between a tube bank circled by a dotted line and side walls, respectively. Vapor enters the absorber at an inlet opening 103 at an upper portion thereof. It is noted from the vapor speed distribution in FIG. 7a that the vapor flows in the vapor flow passages 102 and is supplied into all parts of the tube bank and that final vapor flow reaches are around a central portion of the tube bank. The air partial pressure distribution in this case is shown in FIG. 7b. It also is noted from FIG. 7b that air stays around the final vapor flow reaches and the partial pressure of the air is higher at those reaches. The air of uncondensed gas can be continuously exhausted by providing a gas extraction port around a central portion as in FIG. 3.

Figure 8A:
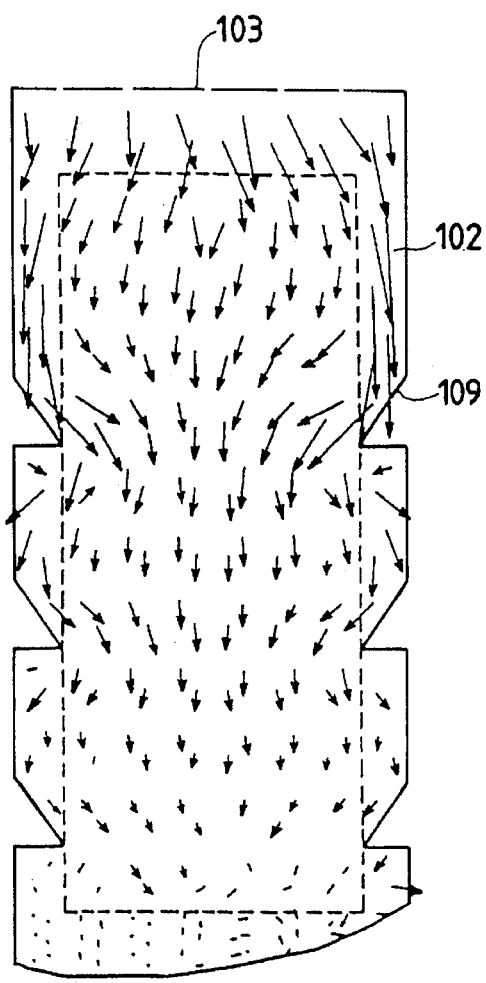
FIG. 8a is a schematic view showing vapor flow speed distribution by numerical analysis in an absorber having vapor flow passages provided with a baffle plate therein.
Figure 8B:
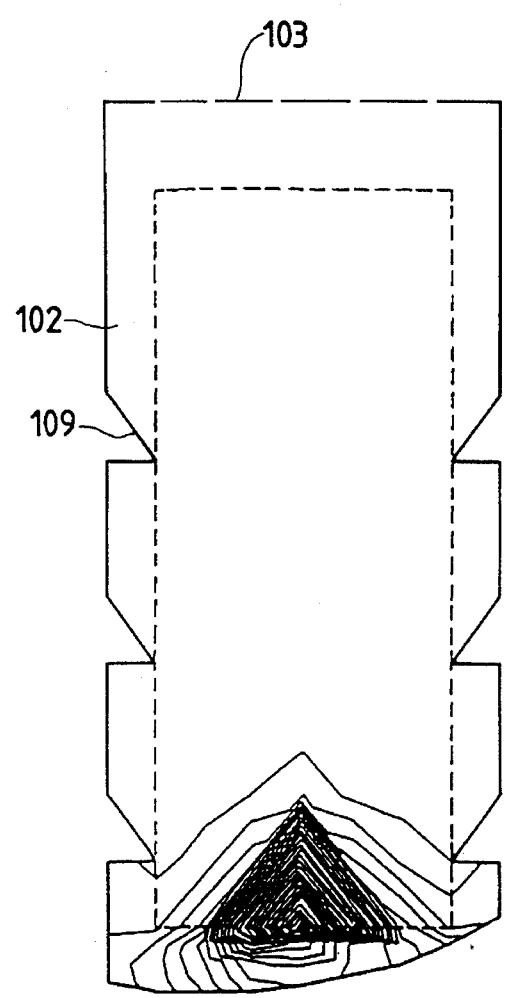

FIGS. 8a and 8b also show numerical analysis results of vapor speed distribution and air partial pressure in an absorber in which vapor flow passages 102 are formed between a tube bank circled by a dotted line and side walls, respectively. In this case, six baffle plates 109 are provided in the vapor flow passages 102. Vapor flows into the absorber from the upper portion and flows down a bottom portion of the tube bank. It is noted from the vapor speed distribution in FIG. 8a that final flow reaches are around the bottom portion of the tube bank. The air partial pressure distribution in this case is shown in FIG. 8b. It also is noted that air stays around the final vapor flow reaches and air partial pressure is higher therearound. Therefore, uncondensed gas can be continuously extracted by providing an extraction port around a lower portion of the tube bank.

What is claimed is:

1. An absorption refrigerator having an evaporator for evaporating liquid therein to generate a vapor; an absorber having a tube bank of heat-conductive tubes for absorbing vapor which has entered the absorber from the evaporator into an absorbent supplied in said absorber, while rejecting absorption heat through the tube bank, wherein said absorber comprises:

a vapor flow passage between a side wall of said absorber and said tube bank opposite to said side wall, said side wall being separated from said tube bank in a radial direction of said heat-conductive tubes of said tube bank;

a gas extraction port disposed outside of said tube bank; and at least one baffle plate disposed in said vapor flow passage for adjusting vapor in said tube bank so that uncondensed gas flows toward said gas extraction port.

2. An absorption refrigerator according to claim 1, wherein said absorber has, at an upper portion thereof, a vapor inlet opening communicating with said evaporator, said vapor flow passage vertically extending from the upper portion to a bottom portion thereof and being provided with at least two baffle plates vertically spaced from each other.

3. An absorption refrigerator according to claim 1, wherein said gas extraction port is provided at a lower portion of said absorber and serves as an outlet port for the absorbent.

4. An absorption refrigerator having an evaporator for evaporating liquid therein to generate a vapor; an absorber having a tube bank of heat-conductive tubes for absorbing vapor which has entered the absorber from the evaporator into an absorbent supplied in said absorber, while rejecting absorption heat through the tube bank, wherein said absorber comprises:

a vapor flow passage between a side wall of said absorber and said tube bank opposite to said side wall, said side wall being separated from said tube bank in a radial direction of said heat-conductive tubes of said tube bank by a distance equal to or larger than a maximum pitch of said heat-conductive tubes, thereby forming said vapor flow passage; and a gas extraction port disposed outside of said tube bank;

and at least one baffle plate disposed in a horizontally and vertically central portion said tube bank.

5. An absorption refrigerator comprising:

an evaporator for evaporating liquid therein to generate a vapor;

an absorber comprising a housing having an inlet opening at an upper side thereof for introducing vapor from said evaporator into said housing, a tube bank of heat-conductive tubes within said housing, a spray device provided at an upper side of said housing for spraying absorbent onto said tube bank, a vapor flow passage between at least one of the side walls of said housing and said tube bank opposite to said one side wall, said one wide wall being separated from said tube bank in a radial direction of said heat-conductive tubes of said tube bank, a gas extraction port disposed outside of said tube bank, and at least one baffle plate disposed in said vapor flow passage for adjusting vapor flow within said housing so that uncondensed gas in said tube bank flows toward said gas extraction port;

a heat exchanger for preheating absorbent supplied from said absorber;

a generator for heating and concentrating absorbent preheated in said heat exchanger, and for returning concentrated absorbent to said absorber; and a condenser for condensing vapor generated in said generator and returning condensed vapor into said evaporator.

6. An absorption refrigerator according to claim 5, wherein the tubes of said tube bank of heat-conductive tubes are arranged in a plurality of tube rows, said vapor flow passage being formed between one of the outermost tube rows and said side wall opposite to said the outermost tube row, and said baffle plate being inclined with respect to said side wall so as to direct vapor flow in said vapor flow passage toward the tube banks.

7. An absorption refrigerator according to claim 5, wherein the tubes of said tube bank of heat-conductive tubes are arranged in a plurality of tube rows, a vapor flow passage is formed between each of the outermost tube rows and each side wall of said housing opposite to each outermost tube row and has at least two baffle plates spaced vertically from each other and inclined with respect to said side wall.

8. An absorption refrigerator comprising:

an evaporator for evaporating liquid therein to generate a vapor;

an absorber comprising a housing having an inlet opening at an upper side thereof for introducing vapor from said evaporator into said housing, a tube bank of heat conductive tubes within said housing, a spray device provided at an upper side of said housing for spraying absorbent onto said tube bank, a vapor flow passage between at least one of the side wall of said housing and said tube bank opposite to said one side wall, said one side wall being separated from said tube bank in a radial direction of said heat-conductive tubes of said tube bank by a distance equal to or larger than a maximum pitch of said heat-conductive tubes, at least one baffle plate disposed in said vapor flow passage for adjusting vapor flow within said housing to direct the vapor flow toward said tube bank, and a gas extraction port;

a heat exchanger for preheating absorbent supplied from said absorber;

a generator for heating and concentrating absorbent preheated in said heat exchanger and for returning concentrated absorbent to said absorber; and a condenser for condensing vapor generated in said generator and returning condensed vapor into said evaporator, wherein the tubes of said tube bank of heat conductive tubes are arranged in a plurality of tube rows, said vapor flow passage being formed between one of the outermost tube rows and said side wall opposite to said the outermost tube tow, baffle plate being inclined with respect to said side walls so as to direct vapor flow in said vapor flow passage toward the tube bank, the tubes of said tube bank of heat conductive tubes are arranged in a plurality of tube rows, a vapor flow passage is formed between each of the outermost tube rows and each side wall of said housing opposite to each outermost tube row and has at least two baffle plates spaces vertically from each other and inclined with respect to said side wall, and wherein said baffle plates are spaced vertically and each are inclined with respect to the side wall at predetermined inclination angles, an inclination angle of one of said baffle plates at a lower portion being larger than an inclination angle of another of said baffle plates at a higher portion of the vapor flow passage.

9. An absorption refrigerator according to claim 8, wherein said tube bank is in a lattice form in which a horizontal pitch between adjacent heat-conductive tubes in a horizontal direction is larger than a vertical pitch between adjacent heat-conductive tubes in a vertical direction.

10. An absorption refrigerator comprising:

an absorber having an eliminator forming an inlet opening for horizontally introducing vapor from said evaporator into said absorber while removing mist contained therein, a tube bank of heat-conductive tubes within said absorber, a spray device provided at an upper side of said absorber for spraying absorbent onto said tube bank, vapor flow passages formed between a side wall of said absorber and said tube bank opposite to said side wall and between said eliminator and said tube bank opposite to said eliminator, said side walls each being separated from said tube bank in a radial direction of said heat-conductive tubes of said tube bank, baffle plates disposed in said vapor flow passages for adjusting vapor flow within said housing so that uncondensed gas in said tube bank flows toward a gas extraction port disposed on the side wall opposite to said eliminator;

a heat exchanger for preheating absorbent received from said absorber;

a generator for heating and concentrating absorbent preheated in said heat exchanger, and for returning concentrated absorbent to said absorber; and a condenser for condensing vapor generated in said generator and returning condensed vapor into said evaporator.

11. An absorption refrigerator according to claim 10, wherein said tube bank is in a lattice form in which a horizontal pitch between adjacent heat-conductive tubes in a horizontal direction is larger than a vertical pitch between adjacent heat-conductive tubes in a vertical direction.

12. An absorption refrigerator according to claim 1, wherein said side wall is separated from said tube bank in a radial direction of said heat-conductive tubes of said tube bank by a distance equal to or larger than a maximum pitch of said heat-conductive tubes, thereby forming said vapor flow passage.

13. An absorption refrigerator according to claim 12, wherein said at least one baffle plate is disposed at a position a little lower than a half of a height of said tube bank.

14. An absorption refrigerator having an evaporator for evaporating liquid therein to generate vapor, an absorber for absorbing vapor flowing in the absorber from the evaporator into an absorbent supplied in the absorber while rejecting absorption heat, wherein said absorber comprises:

a single tube bank of a plurality of heat-conductive tubes for rejecting absorption heat therethrough, said plurality of heat-conductive tubes having a horizontal pitch between adjacent heat-conductive tubes in a horizontal direction which is larger than a vertical pitch between adjacent heat-conductive tubes in a vertical direction;

a vapor flow passage defined between a side wall of said absorber and said tube bank opposite to said side wall, and extending in a vertical direction and in an axial direction of said heat-conductive tubes;

a gas extraction port disposed outside said tube bank; and at least one device disposed in said vapor flow passage for adjusting a vapor flow in said tube bank so that uncondensed gas in said tube bank flows toward said gas extraction port.

15. An absorption refrigerator according to claim 14, wherein said gas extraction port is disposed at a lower side of said absorber.

16. An absorption refrigerator according to claim 15, wherein said at least one device is disposed at a selected position of the height of said tube bank and inclined to direct the vapor flow in said vapor flow passage toward said tube bank so that the uncondensed gas in said tube bank reaches said gas extraction port.

17. An absorption refrigerator having an evaporator for evaporating liquid therein to generate a vapor, an absorber for absorbing a vapor flowing in the absorber from the evaporator into an absorbent supplied in the absorber, while rejecting absorption heat, wherein said absorber comprises:

a housing having an inlet opening at an upper side thereof for introducing a vapor from said evaporator into said housing, and a gas extraction port at a lower side thereof;

a tube bank of heat-conductive tubes within said housing for rejecting absorption heat therethrough, said tube bank of heat-conductive tubes having a horizontal pitch between adjacent heat-conductive tubes in a horizontal direction which is larger than a vertical pitch between adjacent heat-conductive tubes in a vertical direction;

a spray device provided at an upper side of said housing for spraying an absorbent onto said tube bank;

a vapor flow passage between at least one of side walls of said housing and said tube bank opposite to said one side wall, said one wide wall being separated from said tube bank in a radial direction of said heat-conductive tubes of said tube bank by a distance equal to or larger than a maximum pitch of said heat-conductive tubes; and at least one device disposed in said vapor flow passage for adjusting a vapor flow within said housing so that uncondensed gas in said tube bank flows toward said gas extraction port of said housing.

18. An absorption refrigerator according to claim 17, wherein said at least one device is disposed at a selected position of a height of said tube bank, and inclined to direct the vapor flow in said vapor flow passage toward said bank so that the uncondensed gas in said tube bank reaches said gas extraction port.

19. An absorption refrigerator according to claim 1, wherein said at least one baffle plate is a flat plate having no hole therein.

20. An absorption refrigerator according to claim 17, wherein said at least one device is a flat plate having no hole therein.

21. An absorption refrigerator according to claim 5, wherein said side wall is separated from said tube bank in a radial direction of said heat-conductive tubes of said tube bank by a distance equal to or larger than a maximum pitch of said heat-conductive tubes, thereby forming said vapor flow passage.

22. An absorption refrigerator according to claim 10, wherein said side wall is separated from said tube bank in a radial direction of said heat-conductive tubes of said tube bank by a distance equal to or larger than a maximum pitch of said heat-conductive tubes, thereby forming said vapor flow passage.

* * * * *